United States Patent
Ma et al.

(10) Patent No.: US 10,776,939 B2
(45) Date of Patent: Sep. 15, 2020

(54) OBSTACLE AVOIDANCE SYSTEM BASED ON EMBEDDED STEREO VISION FOR UNMANNED AERIAL VEHICLES

(71) Applicant: AltumView Systems Inc., Burnaby (CA)

(72) Inventors: Rui Ma, Burnaby (CA); Chao Shen, Richmond (CA); Yu Gao, North Vancouver (CA); Ye Lu, Coquitlam (CA); Minghua Chen, Coquitlam (CA); Jie Liang, Coquitlam (CA); Jianbing Wu, Coquitlam (CA)

(73) Assignee: AltumView Systems Inc., Port Moody, BC (CA)

( * ) Notice: Subject to any disclaimer, the term of this patent is extended or adjusted under 35 U.S.C. 154(b) by 230 days.

(21) Appl. No.: 15/943,978

(22) Filed: Apr. 3, 2018

(65) Prior Publication Data
US 2019/0304120 A1   Oct. 3, 2019

(51) Int. Cl.
*G06K 9/00* (2006.01)
*G06T 7/593* (2017.01)
*B64C 39/02* (2006.01)

(52) U.S. Cl.
CPC ............ *G06T 7/596* (2017.01); *B64C 39/024* (2013.01); *G06K 9/00805* (2013.01); *B64C 2201/123* (2013.01)

(58) Field of Classification Search
CPC ............ G06K 9/00228; G06K 9/00805; G06T 7/593; G06T 7/596; G06T 2207/10012; B64C 2201/123; B64C 39/024

USPC ......................................................... 382/154
See application file for complete search history.

(56) References Cited

U.S. PATENT DOCUMENTS

| | | | | |
|---|---|---|---|---|
| 2010/0158387 | A1* | 6/2010 | Choi ................. | G06K 9/00228 382/195 |
| 2017/0206415 | A1* | 7/2017 | Redden .............. | H04N 13/204 |
| 2018/0348764 | A1* | 12/2018 | Zhang ................. | G05D 1/0088 |
| 2019/0220002 | A1* | 7/2019 | Huang ................. | B64C 39/024 |
| 2019/0273909 | A1* | 9/2019 | Ye .......................... | G01B 11/14 |
| 2019/0370983 | A1* | 12/2019 | Zhou .................... | G06K 9/4671 |

* cited by examiner

*Primary Examiner* — Ali Bayat

(57) ABSTRACT

Embodiments described herein provide various examples of an automatic obstacle avoidance system for unmanned vehicles using embedded stereo vision techniques. In one aspect, an unmanned aerial vehicle (UAV) capable of performing autonomous obstacle detection and avoidance is disclosed. This UAV includes: a stereo vision camera set coupled to the one or more processors and the memory to capture a sequence of stereo images; and a stereo vision module configured to: receive a pair of stereo images captured by a pair of stereo vision cameras; perform a border cropping operation on the pair of stereo images to obtain a pair of cropped stereo images; perform a sub sampling operation on the pair of cropped stereo images to obtain a pair of sub sampled stereo images; and perform a dense stereo matching operation on the pair of sub sampled stereo images to generate a dense three-dimensional (3D) point map of a space corresponding to the pair of stereo images.

20 Claims, 8 Drawing Sheets

OBSTACLE AVOIDANCE SYSTEM BASED ON EMBEDDED STEREO VISION FOR UNMANNED AERIAL VEHICLES

TECHNICAL FIELD

The present disclosure generally relates to the field of machine vision, and more specifically to systems, devices and techniques for performing efficient obstacle avoidance flight control for unmanned aerial vehicles (UAVs) or drones.

BACKGROUND

Recently, consumer and commercial unmanned aerial vehicles (UAVs) or "drones," a type of miniature pilotless aircrafts, have gained tremendous popularity and commercial success worldwide. An UAV or a drone is generally controlled by a remote controller and/or software and uses aerodynamic effects, e.g., generated by multirotors, to maneuver through the air with very high stabilities and to perform various designed functionalities, such as surveillance and package delivery. One of the most popular applications of consumer UAVs or drones is aerial photography, i.e., to take still photographs or record videos from a vantage point above the subject being photographed. The latest versions of consumer drones are generally lightweight and easy to control, so that they can be navigated safely by casual users. In addition to the manual control functionality, some high-end consumer drones are also equipped with obstacle detection and avoidance functionalities which provide essential and additional safety for UVA navigation. Such functionalities would allow a drone to stop in front of an obstacle or fly around the obstacle by changing the flight path automatically if necessary.

Many sensor-based obstacle-sensing techniques have been explored to detect and avoid obstacles for drones. Depending on the applications, multiple sensors can be employed either independently or jointly to estimate the distance or depth of an obstacle in front of a flying drone. For example, time-of-flight sensors can provide accurate distance measurements up to 2 meters, while more expensive LIDAR sensors can detect obstacles at a range of more than 200 meters. Compared to the above and other types of sensors, sensors that employ stereo vision techniques can achieve both long detection range (up to 15 meters) and low production cost. As a result, drones equipped with stereo-vision-based obstacle avoidance features have gained great popularity, e.g., DJI Phantom 4.

A stereo vision system typically computes three-dimensional (3D) information based on pairs of images (also referred to as "stereo images") captured by two cameras positioned at slightly different viewpoints. One of the key steps of estimating 3D information based on the captured stereo images is "stereo matching." The objective of stereo matching is to establish the correspondences between pair of points in a pair of stereo images. Based on the matched pairs of points, a disparity map can be computed. Once the disparity map is obtained, depth and 3D information can be quickly obtained based on the disparity map through triangulation. One of the effective stereo matching techniques is semi-global block matching or "SGBM" (see Hirschmuller, "Accurate and efficient stereo processing by semi-global matching and mutual information," in *Proceedings of the 2005 IEEE Computer Society Conference on Computer Vision and Pattern Recognition,* 2005, pp. 807-814), which has shown to produce robust dense stereo matching results.

However, the computational cost of SGBM is generally too high for embedded systems such as drones, which have computational resource limitations. For example, some experiments have shown that a stereo matching operation using SGBM technique for a pair of 640×480 pixels resolution images can only run at about 4.3 frames per second (fps) on RK3399, a six-core high performance embedded platform using two ARM Cortex-A72 CPUs. To speed up the SGBM-based stereo matching operation on embedded systems, a dedicated field programmable gate array (FPGA) can be employed to perform SGBM operations in the hardware. This technique has shown processing speed of 60 fps when calculating dense disparity map on images with 752×480 pixels resolution. However, using dedicated FPGA in an embedded system inevitably increases the overall system cost.

Contrary to the techniques aimed at generating dense disparity maps at high hardware cost, a high efficiency "pushbroom stereo" technique was proposed for high-speed autonomous obstacle detection and avoidance (see Barry et al., "High-speed autonomous obstacle avoidance with pushbroom stereo," *Journal of Field Robotics,* vol. 35, no. 1, pp. 52-68, 2018). Instead of performing dense stereo matching for each image frame, the pushbroom stereo technique only searches for a single depth value (at a fixed distance) of stereo correspondence. The missing depth information other than currently searched value is then recovered by integrating drone's odometry data and previously determined single-disparity results. Next, the pushbroom stereo results are combined with a model-based control system to enable a high-speed flight (10-14 m/s) in natural environments, while automatically avoiding obstacles such as trees. Unfortunately, the pushbroom stereo technique scarifies a level of reliability for the high speed. Without the dense disparity map, the technique may function relatively well in some simple obstacle environments, but not for many of the more complex obstacle environments.

Hence, there is a need for a relatively low-complexity, low-cost and yet relatively high-speed, high-reliability obstacle detection and avoidance system and technique without the problems described above.

SUMMARY

Embodiments described herein provide various examples of an automatic obstacle avoidance system for unmanned vehicles using embedded stereo vision techniques. In one aspect, an unmanned aerial vehicle (UAV) capable of performing autonomous obstacle detection and avoidance is disclosed. This UAV includes: one or more processors; a memory coupled to the one or more processors; a stereo vision camera set coupled to the one or more processors and the memory, the stereo vision camera set is configured to capture a sequence of stereo images; and a stereo vision module configured to: receive a pair of stereo images captured by a pair of stereo vision cameras; perform a border cropping operation on the pair of stereo images to obtain a pair of cropped stereo images; perform a subsampling operation on the pair of cropped stereo images to obtain a pair of subsampled stereo images; and perform a dense stereo matching operation on the pair of subsampled stereo images to generate a dense three-dimensional (3D) point map of a space corresponding to the pair of stereo images. Using cropped and subsampled stereo images to perform dense stereo matching significantly speeds up the dense stereo matching operation.

In some embodiments, prior to performing the dense stereo matching operation on the pair of subsampled stereo images, the stereo vision module is configured to perform a rectification operation on the pair of subsampled stereo images to remove image distortion and to establish spatial references for the 3D point map using the position of one of the cameras in the stereo vision system.

In some embodiments, after generating the dense 3D point map, the stereo vision module is configured to perform a noise removal operation on the dense 3D point map to remove noise introduced by textureless regions in the space from the computed 3D point map.

In some embodiments, the stereo vision camera set is configured to capture a flight environment of the UAV during a flight of the UAV.

In some embodiments, the UAV also includes an obstacle detection module coupled to the stereo vision module and configured to use the obtained dense 3D point maps to detect obstacles for the UAV.

In some embodiments, the UAV also includes an obstacle avoidance module coupled to the obstacle detection module and the stereo vision module and configured to use the obtained dense 3D point maps to make obstacle avoidance decisions for the UAV if an obstacle is detected.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Embodiments described herein provide various examples of an automatic obstacle avoidance system for unmanned vehicles using embedded stereo vision techniques. Apart from existing dense stereo matching techniques, the proposed obstacle avoidance system aims to perform fast dense stereo matching on general embedded platforms. The proposed obstacle avoidance system includes a stereo vision module for performing 3D point map estimation, and a flight control module for updating flight status based on the 3D point map estimation. Meanwhile, the proposed obstacle avoidance system does not require a FPGA to perform dense stereo matching operation, so that the proposed system can be adapted by many conventional embedded platforms for various applications. The proposed obstacle avoidance system provides an effective obstacle avoidance scheme for UAVs, drones and other autonomous self-driving vehicles. Moreover, the ability of the proposed obstacle avoidance system to obtain dense stereo matching results allows the system to perform obstacle avoidance operations in more complex environments, e.g., scenes with trees, walls and other textured objects.

Figure 1:
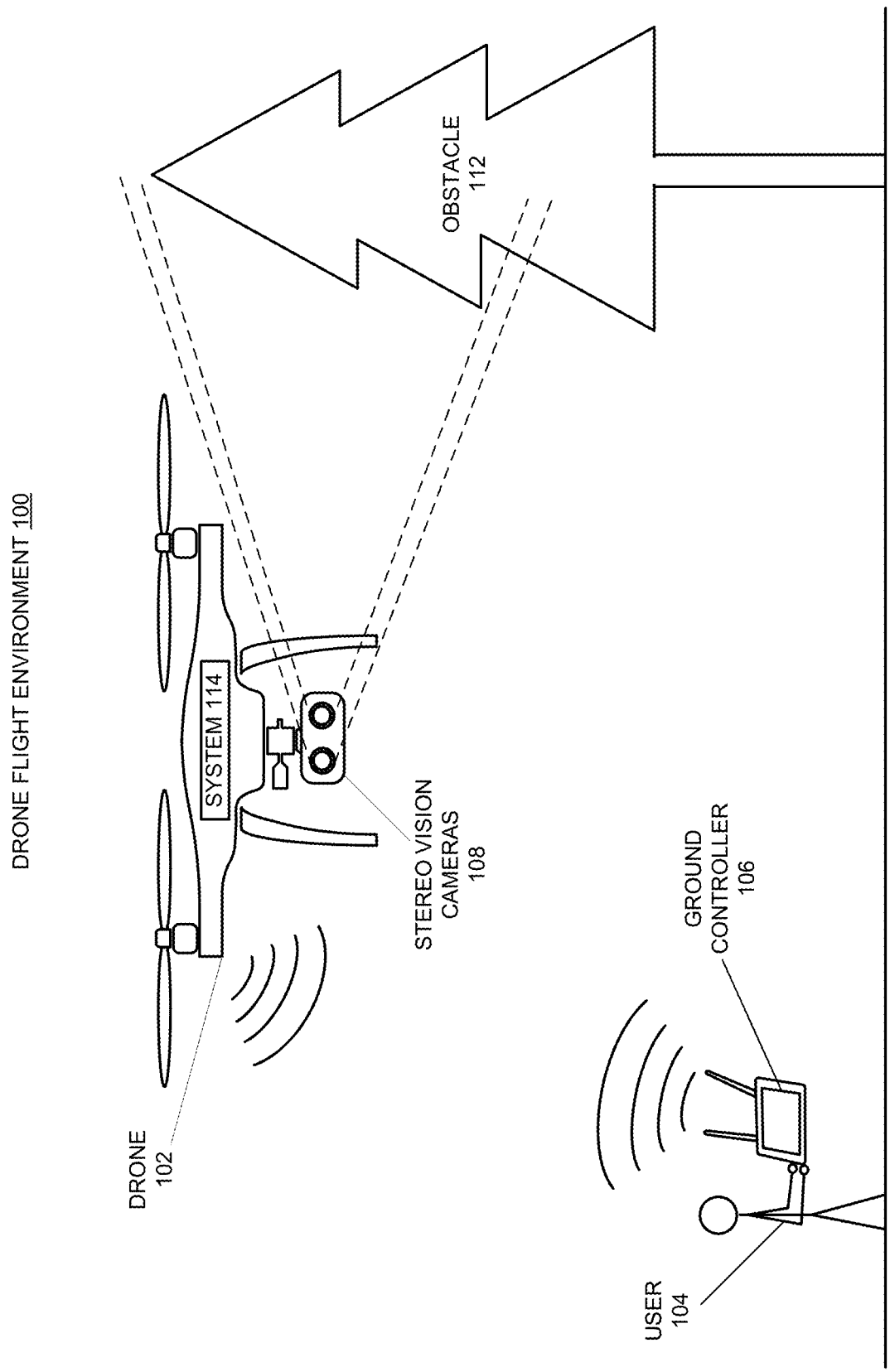
FIG. 1 illustrates an exemplary drone flight environment which includes a drone, a user, and an obstacle in accordance with some embodiments described herein.

FIG. 1 illustrates an exemplary drone flight environment 100 which includes a drone 102, a user 104, and an obstacle 112 in accordance with some embodiments described herein. As can be seen in FIG. 1, user 104 controls a flight of drone 102 with a ground controller 106, which is a handheld device. Drone 102 includes a pair of stereo vision cameras 108 which is mounted on drone 102 through a gimbal 110. In some embodiments, gimbal 110 is a three-axis gimbal to allow stereo vision cameras 108 three-degree of freedom in movement. Camera gimbal 110 can also be controlled by user 104 through ground controller 106 so that stereo vision cameras 108 can aim at a location or a target selected by user 104. While in flight, stereo vision cameras 108 onboard drone 102 can capture a sequence of stereo vision images at a given frame rate.

The system for performing the disclosed obstacle detection and avoidance functions can be implemented on a platform (e.g., a system-on-chip (SoC)) embedded within drone 102. In the embodiment of FIG. 1, the disclosed obstacle detection and avoidance functions are implemented on drone 102 as an obstacle detection and avoidance system 114 (or simply "system 114" as shown in FIG. 1). In some embodiments, while flying in flight environment 100, drone 102 is configured to perform an autonomous obstacle detection and avoidance operation, such as to first detect and then take automatic actions to avoid collision with a tree 112 which is in the flight path of drone 102, without the intervention from user 104.

Figure 2:
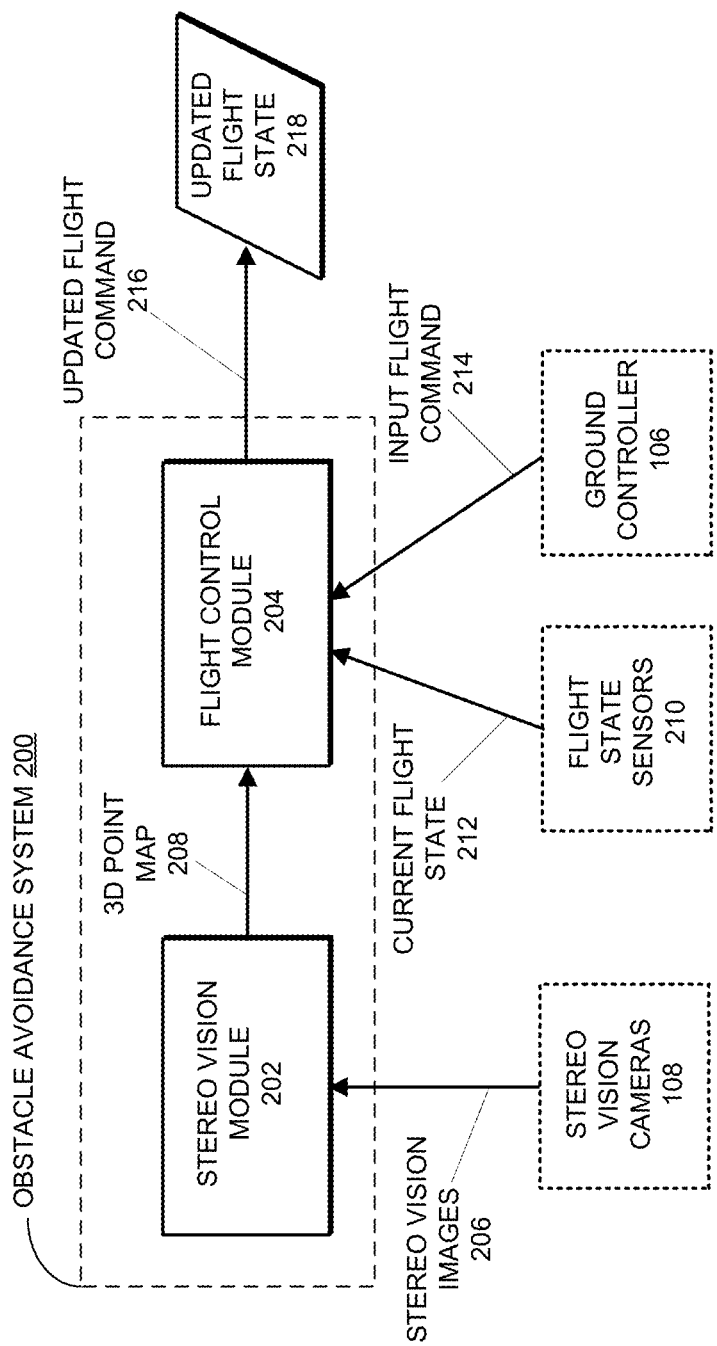
FIG. 2 illustrates an exemplary implementation of the proposed obstacle detection and avoidance system in FIG. 1 in accordance with some embodiments described herein.

FIG. 2 illustrates an exemplary implementation 200 of obstacle detection and avoidance system (or "obstacle avoidance system") 114 in FIG. 1 in accordance with some embodiments described herein. As can be seen in FIG. 2, obstacle avoidance system 200 includes various functional modules to perform various functionalities including, but are not limited to performing three-dimensional (3D) point map estimation, performing obstacle detection, and controlling obstacle avoidance maneuvers. Obstacle avoidance system 200 is integrated with drone 102 to facilitate processing received stereo vision images, detecting obstacles from the processed stereo vision images, controlling the flight of drone 102 both under normal flight conditions and when an obstacle in the flight path of drone 102 is detected. However, the disclosed obstacle avoidance system 200 can also be implemented on other embedded platforms to perform obstacle detection and avoidance functionalities. These other embedded platforms can include, but are not limited to, a robotic system, a self-driving vehicle, and other unmanned vehicles.

Note that obstacle avoidance system 200 includes at least a stereo vision module 202 and a flight control module 204. Stereo vision module 202 receives pairs of stereo images 206 of the current flight environment captured by the two cameras within stereo vision cameras 108. Stereo vision module 202 is configured to process a pair of stereo images 206 of the current flight environment and generate a 3D point map 208 which encodes the relative positions of objects (e.g., tree 112 in FIG. 1) in the current flight environment to drone 102. As newer stereo images 206 of current environment are received, 3D point map 208 is continuously updated to stay current.

Flight control module 204 is coupled downstream from stereo vision module 202 to receive a sequence of 3D point maps 208 generated from a sequence of stereo vision images 206. Flight control module 204 is also coupled to a set of flight state sensors 210 to receive current flight state 212 of drone 102, wherein current flight state 212 can include flight status data such as the speed, pitch and roll angles of the drone measured by flight state sensors 210. Flight control module 204 is additionally coupled to ground controller 106, through which to receive input flight command 214 from user 104. Flight control module 204 is configured to combine current flight state 212 with current 3D point map 208 to generate updated flight commands 216. In some embodiments, updated flight commands 216 include updated speed, acceleration, pitch angle, and roll angle of the drone. Updated flight commands 216 are then used by drone 102 to generate updated flight state 218, including controlling drone 102 to either keep current flight path or perform obstacle avoidance maneuvers. Note that ground controller 106 is not a necessarily part of obstacle avoidance system 200 since the drone can also perform obstacle avoidance after receiving an autonomous navigation command, e.g., fly straight forward. More detail embodiments of obstacle avoidance system 200 are provided below.

Stereo Vision Module Implementation

Figure 3:
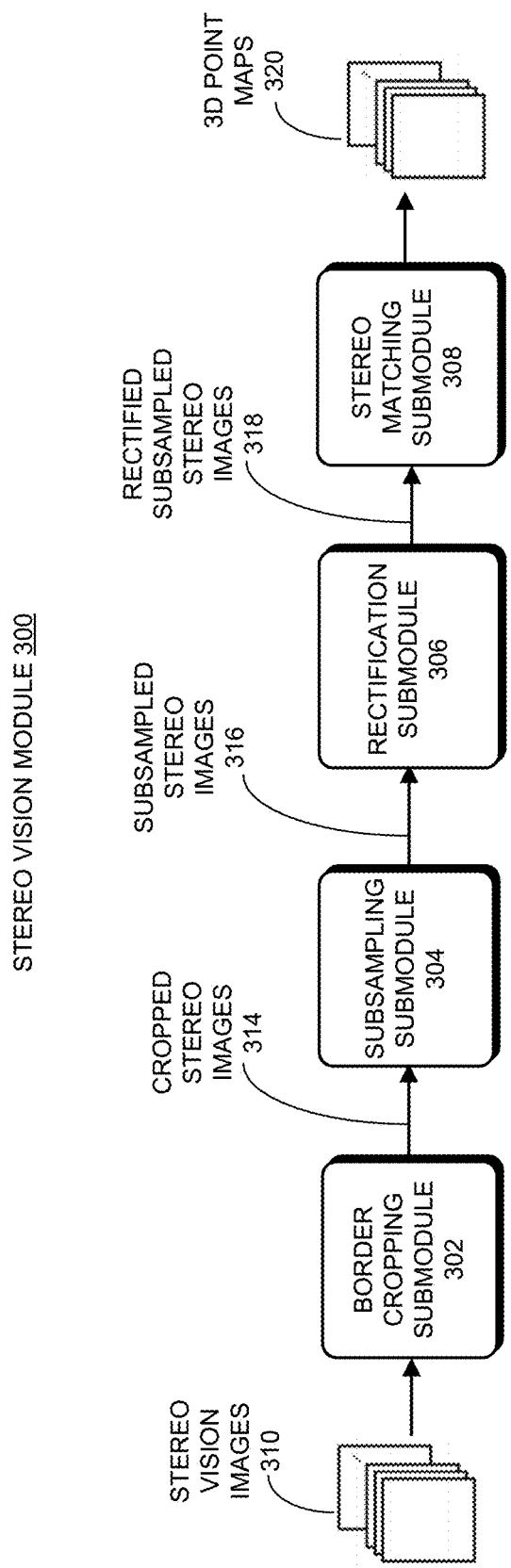
FIG. 3 shows a block diagram of an exemplary implementation of the stereo vision module in the disclosed obstacle avoidance system in accordance with some embodiments described herein.

As described above, stereo vision module 202 is configured to receive a sequence of stereo images of current environment and generate a sequence of 3D point maps using a dense-stereo-matching technique, such as SGBM. To effectively performing SGBM on resource-limited embedded systems without a dedicated FPGA, a number of improvements/modifications are made to a conventional dense-stereo-matching technique. FIG. 3 shows a block diagram of an exemplary implementation 300 of the stereo vision module 202 in the disclosed obstacle avoidance system 200 in accordance with some embodiments described herein. As can be seen in FIG. 3, stereo vision module 300 includes a border cropping submodule 302, a subsampling submodule 304, a rectification submodule 306, and a stereo matching submodule 308, which are coupled in series in that order. Stereo vision module 300 receives stereo vision images 310 as input and generates 3D point maps 320 as output.

In some embodiments, border cropping submodule 302 is configured to crop out image borders to remove a large portion of each full-size input image 310 corresponding to regions not in the drone's flight path. The output of border cropping submodule 302 is cropped stereo images 314. Next, subsampling submodule 304 is applied to the cropped stereo images 314 to reduce image resolution and output subsampled stereo images 316. Both border cropping submodule 302 and subsampling submodule 304 are designed to speed up the subsequent dense stereo-matching operation by reducing the number of pixels in the images. Next, rectification submodule 306 performs rectification on the subsampled stereo images 316 to remove image distortion caused by the physical property of the camera lens and to establish spatial references for the future 3D point maps using either the center of the left camera or the center of the right camera of the stereo cameras as the rectification reference. Rectification submodule 306 outputs rectified subsampled stereo images 318.

Next in stereo vision module 300, stereo matching submodule 308 performs stereo matching on rectified subsampled stereo images 318 and generates 3D point maps 320 for each frame of the subsampled stereo images. In a computed 3D point map, each pixel encodes the 3D coordinates of a point in the current flight environment. If the rectification is processed with reference to the left camera, then the coordinate frame of the 3D point map is centered on the center of the left camera. Moreover, the z coordinate of the 3D coordinates at a given 3D point corresponds to the depth of the point, i.e., the estimated distance from an object ahead of the drone.

In some embodiments, after generating the 3D point maps, a noise removal submodule (not shown) is used to remove noise introduced by textureless regions such as sky from the computed 3D point maps. Note that in some variations to the embodiment of stereo vision module 300, one of the two submodules 302 and 304 may be skipped depending on the computation power of the system. We now describe each of the submodules in stereo vision module 300 in more detail.

Note that for most of the drone obstacle avoidance applications, it is not necessary to compute a 3D point map for every pixel in a pair of stereo vision images 310. This is because those pixels near the border of an image most-likely correspond to regions of the environment that are not in the drone's flight path. As a result, the border areas of the original stereo images can be cropped out before any further processing on these stereo images. The cropped stereo images are significantly smaller than the input images to allow significant increase in processing speed. In some embodiments, border cropping submodule 302 is controlled by one or more parameters, including a cropping ratio $\alpha$ which is a value between 0 and 1. Applying a cropping ratio $\alpha$ means keeping an inner $\alpha$ portion of (e.g., $\alpha$=0.5 or 50%) of the image pixels (i.e., in both vertical and horizontal directions) while cropping out the image pixels outside of the inner $\alpha$ portion. In some implementations, setting $\alpha$=0.75 can improve the efficiency of stereo matching while not losing much information of the potential obstacles.

In conventional dense-stereo-matching techniques, stereo images from left and right cameras are first rectified to remove the image distortion caused by the physical property of the camera lens. Next, dense-stereo-matching such as SGBM can be used to achieve more accurate stereo correspondence search. However, both image rectification and SGBM are high-computational complexity operations and the associated computation times are highly sensitive to the input image resolution. The goal of using subsampling submodule 304 is to reduce the image resolution to some degree to speed up the stereo matching process without cause significant decrease in stereo matching accuracy. In stereo vision module 300, cropped stereo images 314 outputted by cropping submodule 302 are subsampled with a parameter β to further reduce the stereo image size. The subsampling parameter β controls the final density of the 3D point map and can significantly affect the speed of stereo matching operation at stereo matching submodule 308. Note that the value of parameter β can be empirically determined for a given drone system and the flight environment. In some drone system configurations, it is noticed that β>0.25 would generate smaller 3D point maps but still sufficient large for flight control module 204 to take accuracy obstacle avoidance decisions.

In the disclosed stereo vision module 300, one or both of the border cropping parameter α and the subsampling parameter β can be changed dynamically based on the current flying environment and the computation power of drone embedded platform. Basically, a larger α value means more image information near the image border will be kept and a larger β value corresponds to a 3D point map with a higher resolution. Generally speaking, for detecting obstacles in more complex environments such as trees, using a larger α value and a larger β value can increase the accuracy of obstacle detection. However, the settings of α and β are also affected by the computation power of the associated embedded platform. In some embodiments, setting for parameters α and β can be made flexible and dynamic during a drone's flight. In other words, the user of the drone can change the values of α and β in real-time and the new values of a and ft will then be updated in the proposed stereo vision module 300 to generate 3D point maps based on the new cropping ratio and image resolution. Referring back to FIG. 2, in some embodiments, the disclosed obstacle avoidance system 200 can monitor the computation speed of the 3D point maps in real-time. When the α and β settings are determined to have caused the computation speed to drop below a certain processing threshold (e.g., 15 fps), the stereo vision module 202 will reject the current settings α and β and reset these parameters to their default values.

Figure 4:
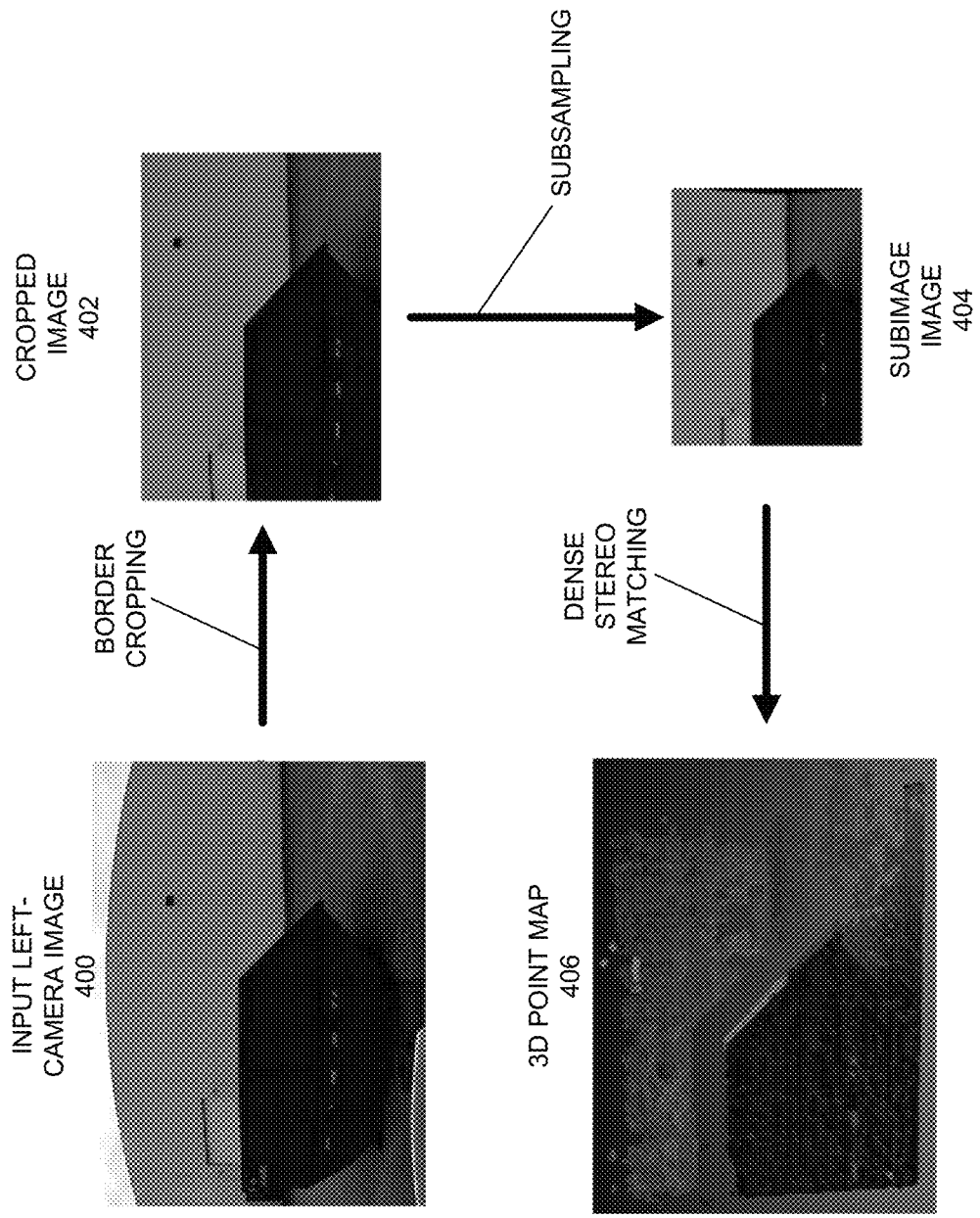
FIG. 4 illustrates the effects of the proposed stereo vision module on a full-size input left-camera image in accordance with some embodiments described herein.

FIG. 4 illustrates the effects of stereo vision module 300 on a full-size input left-camera image 400 in accordance with some embodiments described herein. As can be seen in FIG. 4, input left-camera image 400 (which contains a dumpster and a wall) becomes central portion cropped image 402 after apply border cropping submodule 302; and is further reduced to a much smaller subimage 404 after applying subsampling submodule 304 on cropped image 402. Subimage 404 is then processed by rectification module 306 (not shown) and stereo matching module 308 to generate the corresponding 3D point map 406.

An inherent drawback for many stereo matching techniques is that they often fail at textureless regions. SGBM technique can reduce certain mismatch in the textureless regions by taking into account the global information and performing disparity consistency checks. However, large textureless regions such as the sky, which is frequently observed during the drone flight, can still introduce noises (i.e., large 3D values) that can cause false alarms for the flight control module 204. For such noise points caused by the sky, because the corresponding pixels are most likely to appear in the upper part of the image and their corresponding pixel color values are usually close to blue, a heuristics technique can be used to remove such noise points. Specifically, for a given color image, a proposed noise removal technique can classify a pixel in an input image to be the sky if the intensity value in the blue channel at the given pixel location is greater than a predetermined intensity value (e.g., 200) and the pixel is in the upper part of the image (e.g., the top 25% of the image). In this manner, the proposed noise removal technique can detect most or all such points in large textureless regions, and then remove those points in corresponding 3D point map that correspond to the detected pixels. Note that the proposed noise removal technique can be implemented as another functional submodule in stereo vision module 300, and more specifically following stereo matching submodule 308 to receive the 3D point maps 320. After passing through such a noise removal submodule, the resulting 3D point map, which has the sky substantially removed, can be passed to flight control module 204 in the obstacle avoidance system 200.

Flight Control Module Implementation

As described above in conjunction with FIG. 2, the proposed flight control module 204 is configured to first detect potential obstacles in the 3D point map obtained from the stereo vision module 202 and then combine the obstacle information with the drone's current flight state, such as speed, to compute updated flight commands for the drone. The proposed flight control module can be implemented both in a manual drone flight control mode and an autonomous flight mode. In some embodiments, when an obstacle is detected by flight control module 204, the user's control command or the preset autonomous command is updated by the flight control module 204 to instruct the drone to perform obstacle avoiding maneuvers.

Obstacle Detection Based on 3D Point Map

Figure 5:
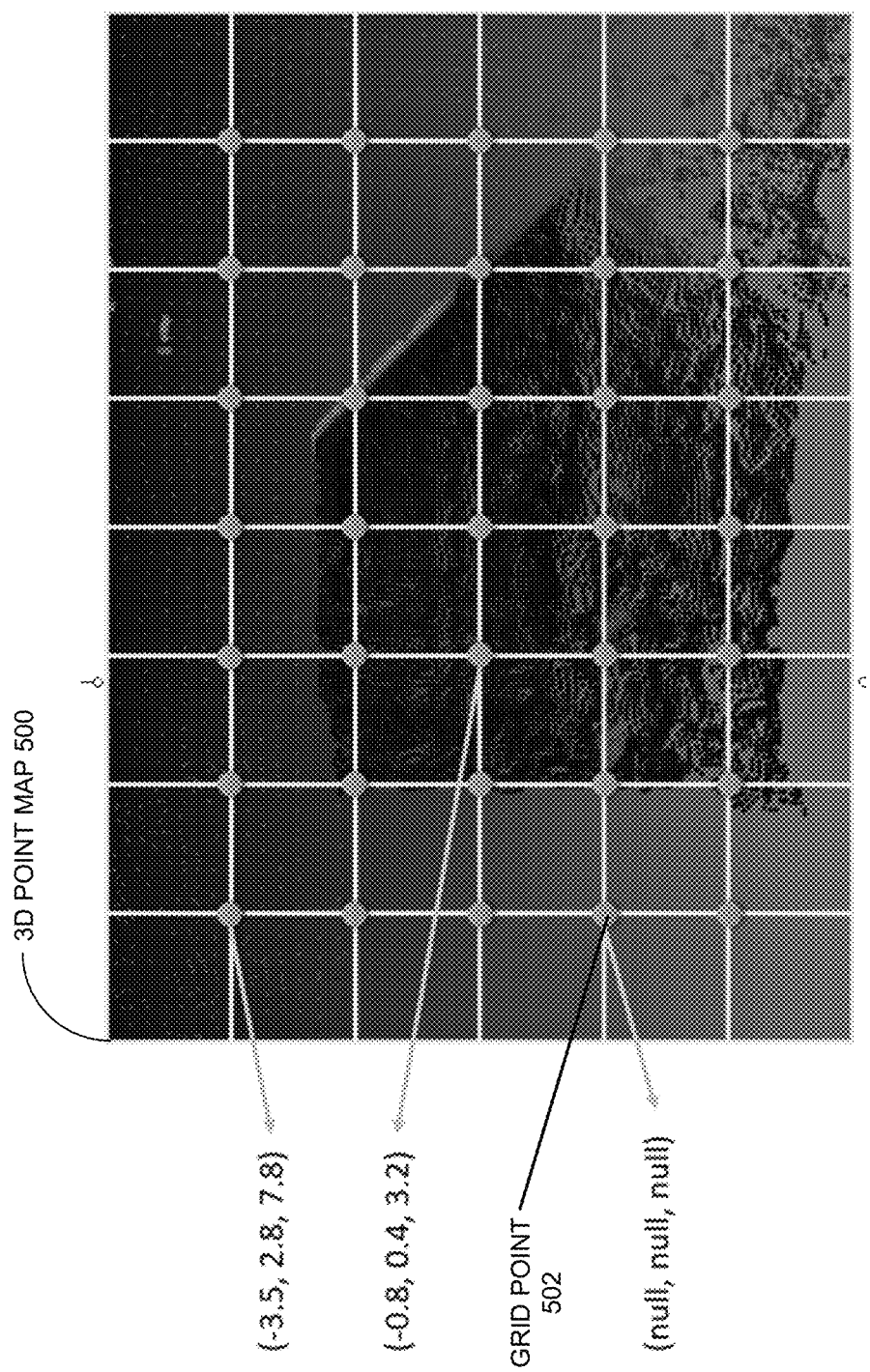
FIG. 5 shows a grid-based 3D point map sampling technique which can be used for detecting obstacles in the 3D point map in accordance with some embodiments described herein.

FIG. 5 shows a grid-based 3D point map sampling technique which can be used for detecting obstacles in the 3D point map in accordance with some embodiments described herein. As can be seen in FIG. 5, 3D point map 500 is overlaid with an 8×6 uniform grid formed by the horizontal and vertical lines. At each grid point (shown as a circular dot), 3D coordinates at that grid point can be obtained based on one or more 3D points in the vicinity of that grid point. The obtained 3D coordinates represent the positions of a sampled 3D point in the original input image relative to the camera/drone. The coordinates in the example of FIG. 5 are shown in meters, with the position of the center of the left camera as the origin (0, 0, 0) and x, y, z axes corresponding to right side, upward and front (and perpendicular to the page) directions.

Figure 6:
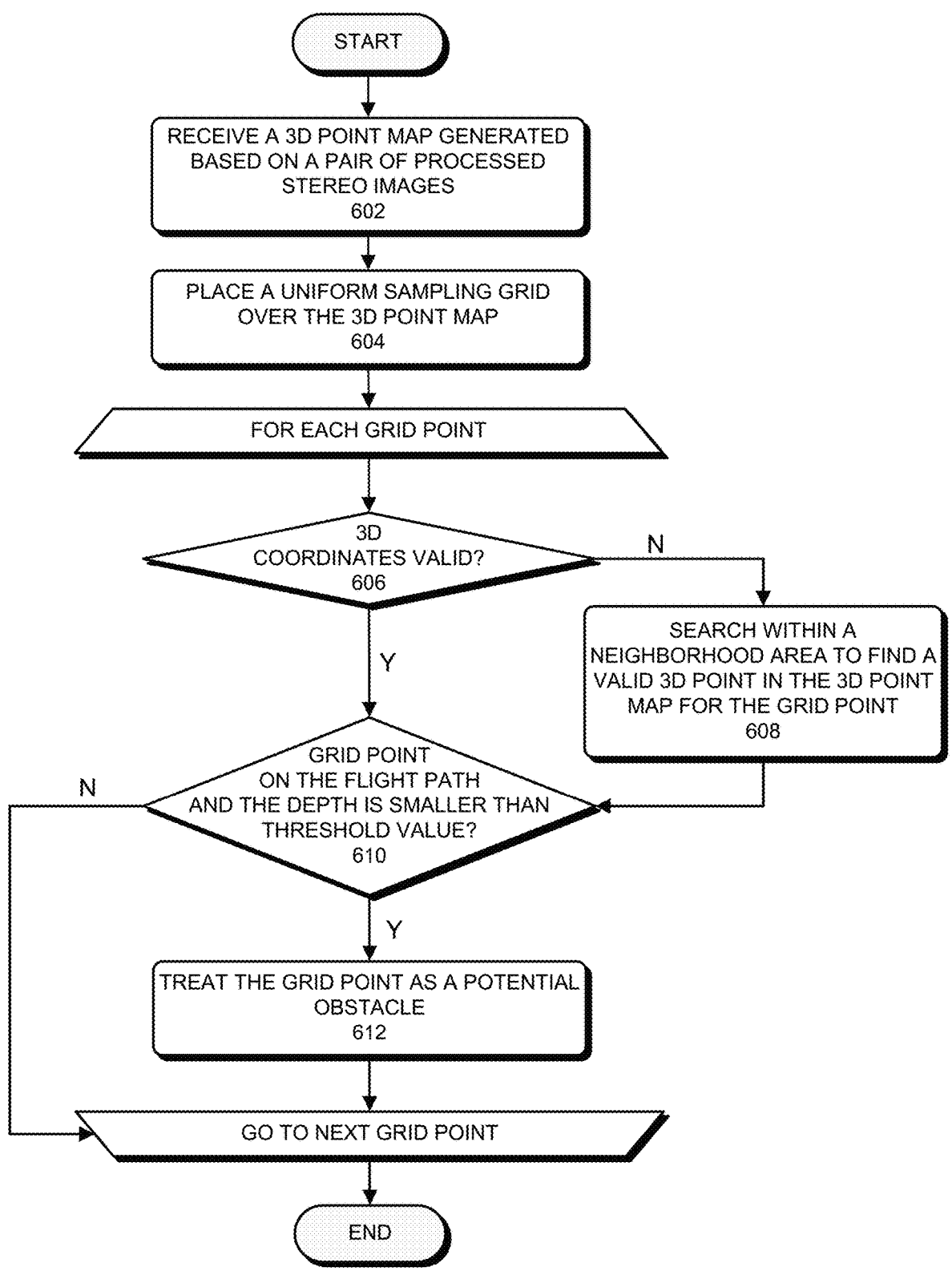
FIG. 6 presents a flowchart illustrating a process for performing obstacle detection based on 3D point maps in accordance with some embodiments described herein.

FIG. 6 presents a flowchart illustrating a process for performing obstacle detection based on 3D point maps in accordance with some embodiments described herein. As mentioned in FIG. 5, the process can use a grid-based technique that uses the 3D positions at uniformly sampled grid points to detect potential obstacles. One motivation to use sampled 3D points instead of all of the computed 3D points is that the original point distribution in the produced 3D point map may be imbalanced. As described above, the process can be performed by flight control module 204 of obstacle avoidance system 200.

The process begins by receiving a 3D point map generated based on a pair of processed stereo images (step 602). The process then places a uniform sampling grid over the 3D point map (step 604). In some embodiments, a uniform M×N (e.g., 16×12) grid is used to sample the 3D point map. Next, at each grid point, the process checks whether the 3D coordinates at that grid point are valid (step 606). This check is necessary because SGBM can return points with null depth value if no stereo matching is found for these points. For each grid point with invalid coordinates (e.g., grid point 502 in FIG. 5), process then searches within a neighborhood area to find a valid 3D point for the grid point (step 608). In some embodiments, a grid point is set to be invalid if all 3D points corresponding to the grid point's neighbor pixels are also invalid. If the grid point can be associated with a valid depth value, the process next determines if the grid point is on the drone's flight path and whether the depth is smaller than a predetermined threshold value (step 610). If so, the grid point is treated as a potential obstacle (step 612). In some embodiments, after sampling, a proposed flight control technique further processes the sampled 3D points to compute updated flight commands. Hence, during the flight, 3D point maps are continuously generated by stereo match module 202, and the 3D point maps are continuously sampled and combined with the drone's current flight state to make the decisions for performing obstacle avoidance maneuvers.

Figure 7:
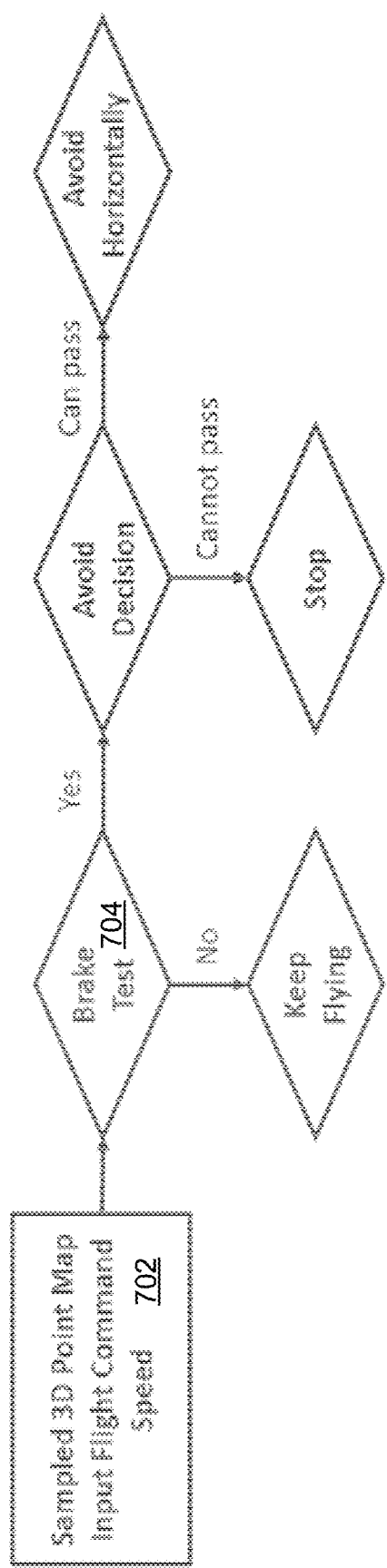
FIG. 7 presents a flowchart illustrating a process for performing obstacle detection and obstacle avoidance maneuvers based on 3D point maps in accordance with some embodiments described herein.

FIG. 7 presents a flowchart illustrating a process for performing obstacle detection and obstacle avoidance maneuvers based on 3D point maps in accordance with some embodiments described herein. In the proposed procedure, three obstacle avoidance maneuvers: brake, stop, and avoid horizontally are used. The process may begin when a sampled 3D point map is received (step 702). Next, the process performs a brake test by counting number of potential obstacle points appearing in the drone's flight path (step 704). In some embodiments, the process defines a point to be a potential obstacle if its depth is less than a predetermined depth value (e.g., 8 m) and the (x, y) position of the point is within a window of predetermined size (e.g., 2 m×2 m) and perpendicular to the drone's flight path. In some embodiments, the window size is dynamically determined based on the drone's speed, the size of the drone, and current environment complexity.

Next, the process determines if there are more than a predetermined number of potential obstacle points (e.g., >30) and the drone's current speed is greater than a predetermined value (e.g., 1 m/s). If so, an obstacle is detected, and the process issues a brake command to the drone (step 708). After the obstacle is detected and the drone starts to brake, the process continues to process new 3D point maps and makes next avoid decision according to the new 3D point maps. At that point, the process can have two options: either cause the drone to further brake and stop in front of an obstacle; or perform horizontal avoiding actions such as by either flying to the left or to the right of the obstacle. The decision is made when there are more than 30 points with depth less than 5 m. To consider the whole environment at a broader scope, we check the distribution of all current sampled points (not only the ones falling in the flying window) and command the drone to stop when large amount of obstacles (more than 30 points) appears in both left and right part of current point map. If one part of the map has less than 30 obstacle points, the drone will try to pass the obstacle by flying to the side with fewer obstacle points. At any time, if on the flight path there are more than 30 points with depth less than 2 m, the drone will take an emergency stop to avoid collision. The algorithm runs on every frame and updates the flight status automatically. When in manual control mode, the stop command will overwrite user's input forward moving command to force the drone to stop in front of obstacles.

Use Case

The disclosed obstacle avoidance system 200 can be implemented on a wide range of embedded systems equipped with a wide range of processors, including an ARM-based system on chip (SoC). In a particular implementation, the obstacle avoidance system 200 is implemented on a Parrot S.L.A.M. dunk (or "Slamdunk") (see Parrot, "Parrot S.L.A.M. Dunk," https://www.parrot.com/hu/en/business-solutions/parrot-slamdunk) embedded system which contains a TK1 (Tegra K1) processor. The slamdunk drone system has a built-in stereo camera set which is composed of two high-resolution fisheye cameras installed horizontally with a baseline distance of 20 cm. The stereo camera set can produce synchronized stereo images of up to 960p resolution at 60 fps. The TK1 processor includes a quad-core ARM Cortex-A15 2.3 GHz CPU. For testing, the proposed obstacle avoidance system 200 is implemented on the TK1 processor using the stereo images captured by the Slamdunk. To test the generality of the system, the proposed stereo vision module is also tested on a RK3399 board, which is powered by a six-core processor with dual 2.0 GHz CPU clusters: one cluster houses two Cortex-A72 cores and the other cluster contains four Cortex-A53 cores. For the software environment, the disclosed obstacle avoidance system 200 is implemented under robot operating system (ROS). However, the disclosed obstacle avoidance system 200 can also be implemented under other open source operating systems.

For regular images captured by Slamdunk which has 640×480 pixels resolution, when we use $\alpha=0.75$ for boarder cropping and set $\beta=0.25$ on Slamdunk or $\beta=0.5$ on RK3399, the 3D point map generation speed reaches 20.8 fps on Slamdunk and 21.6 fps on RK3399, resulting a 5.1 and 5.3 times performance boost comparing to using the full image on RK3399. The flight control module is tested by flying a Bebop drone towards various kinds of obstacles with speed at 2 m/s. Experiments showed that the drone can successfully perform various proposed avoid maneuvers. When flying towards large obstacles such as walls, bushes and tree crowns, the drone will first brake and then stop in front of the obstacles. When flying towards thin or small objects such as a street light pole, the drone can brake and fly to the left or right side of the obstacle, and continue to fly straightly after passing the obstacle. Experiments shows that the proposed stereo vision system achieves real-time performance on general embedded platforms and the proposed obstacle avoidance system works effectively for avoiding obstacles from trees to walls with drone flight speed>2 m/s.

Figure 8:
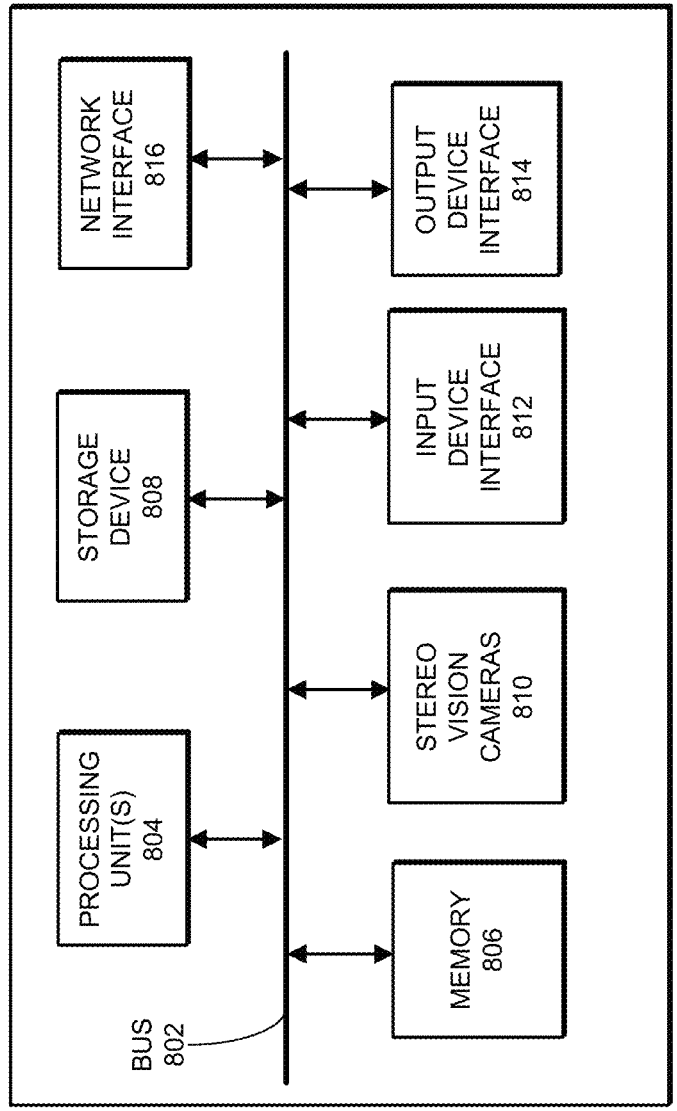
FIG. 8 illustrates an exemplary embedded vision system within which the disclosed obstacle detection and avoidance system and techniques are implemented in accordance with some embodiments described herein.

FIG. 8 illustrates an exemplary embedded vision system 800 (or "embedded system 800" hereinafter) within which the disclosed obstacle detection and avoidance system and techniques are implemented in accordance with some embodiments described herein. Embedded system 800 can be integrated with or implemented as a drone, an UAV, or a self-driving car. As can be seen in FIG. 8, embedded system 800 can include a bus 802, processing unit(s) 804, a memory 806, a storage device 808, stereo vision cameras 810, an input device interface 812, an output device interface 814, and a network interface 816.

Bus 802 collectively represents all system, peripheral, and chipset buses that communicatively couple the various components of embedded system 800. For instance, bus 802 communicatively couples processing unit(s) with memory 806, storage device 808, stereo vision cameras 810, input device interface 812, output device interface 814, and a network interface 816.

From these various memory units, processing unit(s) 804 retrieves instructions to execute and data to process in order to execute various processes, techniques, and functionalities described in this patent disclosure, including the various embodiments of the disclosed visual object tracking system and techniques described in conjunctions with FIGS. 2-7. In particular, processing unit(s) 804 can be configured to perform various disclosed obstacle detection and avoidance operations based on the received stereo vision images using programs and code stored in memory 806. Processing unit(s) 804 can include any type of processor, including, but not limited to, a general purpose processor, a graphic processing unit (GPU), a tensor processing unit (TPU), an intelligent processor unit (IPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Furthermore, processing unit(s) 804 can include one or more cores. Processing unit(s) 804 itself can include a cache that stores code and data for execution by processing unit(s). In a low-end UAV implementation of embedded system 800, processing unit(s) 804 includes at least a quad-core ARM Cortex A7 processor and a Mali 400 MP2 GPU.

Memory 806 can include any type of memory that can store code and data for execution by processing unit(s) 804. In particular, memory 806 can store programs and code that implement various processes, techniques, and functionalities described in this patent disclosure, including the various embodiments of the disclosed obstacle detection and avoidance system and techniques described in conjunctions with FIGS. 2-7. Memory 806 can be configured to receive and buffer captured video frames by camera 810. The type of memory includes but not limited to, dynamic random access memory (DRAM), static random access memory (SRAM), flash memory, read only memory (ROM), and any other type of memory now known or later developed.

Storage device 808 can include any type of non-volatile storage device that can be integrated with embedded system 800. This includes, but is not limited to, magnetic, optical, and magneto-optical storage devices, as well as storage devices based on flash memory and/or battery-backed up memory.

Bus 802 is also coupled to camera 810. Camera 810 is configured to capture still images and/or sequences of video frames at predetermined resolutions and couple the captured image or video data to various components within embedded system 800 via bus 802, such as to memory 806 for buffering and to processing unit(s) 804 for use in visual object tracking. Camera 810 can include one or more digital cameras. In some embodiments, camera 810 includes one or more digital cameras equipped with wide-angle lenses. The captured video frames by camera 810 can have different resolutions including high-resolutions such as at 1280× 720p, 1920×1080p or other lower or higher resolutions.

Bus 802 is also coupled to input device interface 812. Input device interface 812 enables the user to communicate information and select commands to the computer system. Input devices used with input device interface 812 include, for example, a touch-screen display, an alphanumeric keyboard, and a pointing device (also called "cursor control device").

Output device interface 814 which is also coupled to bus 802, enables for example, the display of real-time object track results, such as a target object being tracked and the associated bounding box generated by processing unit(s) 804. Output devices used with output device interface 814 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 8, bus 802 also couples embedded system 800 to a network (not shown) through a network interface 816. In this manner, embedded system 800 can be a part of a network (such as a local area network ("LAN"), a wide area network ("WAN"), or an Intranet, or a network of networks, such as the Internet. Any or all components of embedded system 800 can be used in conjunction with the subject disclosure.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for performing stereo matching on images captured by a stereo vision system, the method comprising:
receiving a pair of input stereo images captured by a pair of stereo vision cameras;
performing a border cropping operation on the pair of input stereo images to obtain a pair of cropped stereo images, thereby reducing the number of pixels in the pair of input stereo images;
performing a sub sampling operation on the pair of cropped stereo images to obtain a pair of sub sampled stereo images, thereby further reducing the number of pixels in the pair of input stereo images; and
performing a dense stereo matching operation on the pair of sub sampled stereo images to generate a dense three-dimensional (3D) point map of a space corresponding to the pair of stereo images;
wherein using cropped and subsampled stereo images to perform dense stereo matching significantly speeds up the dense stereo matching operation.

2. The method of claim 1, wherein prior to performing the dense stereo matching operation on the pair of sub sampled stereo images, the method further comprises performing a rectification operation on the pair of subsampled stereo images to remove image distortion and to establish spatial references for the dense 3D point map using the position of one of the pair of stereo vision cameras in the stereo vision system.

3. The method of claim 1, wherein after generating the dense 3D point map, the method further comprises performing a noise removal operation on the generated dense 3D point map to remove noise introduced by textureless regions in the space from the generated dense 3D point map.

4. The method of claim 1, wherein the stereo vision system is embedded in an unmanned aerial vehicle (UAV) to capture a flight environment of the UAV during a flight of the UAV.

5. The method of claim 4, wherein performing the border cropping operation on the pair of input stereo images includes removing portions of the stereo images correspond to regions of the flight environment that are not in the flight path of the UAV.

6. The method of claim 4, wherein performing the border cropping operation on the pair of input stereo images keeps only the central portions of the pair of stereo images.

7. The method of claim 4, wherein the method further comprises using the generated dense 3D point map to detect obstacles in the flight path.

8. The method of claim 7, wherein the method further comprises using the generated dense 3D point map to make obstacle avoidance decisions for the UAV if an obstacle is detected in the flight path.

9. The method of claim 1, wherein the dense stereo matching operation includes a semi-global block matching (SGBM) operation.

10. An apparatus, comprising:
one or more processors;
memory; and
a program module, wherein the program module is stored in the memory and, during operation of the apparatus, is executed by the one or more processors to:
receive a pair of input stereo images captured by a pair of stereo vision cameras;
perform a border cropping operation on the pair of input stereo images to obtain a pair of cropped stereo images, thereby reducing the number of pixels in the pair of input stereo images;
perform a sub sampling operation on the pair of cropped stereo images to obtain a pair of sub sampled stereo images, thereby further reducing the number of pixels in the pair of input stereo images; and
perform a dense stereo matching operation on the pair of subsampled stereo images to generate a dense three-dimensional (3D) point map of a space corresponding to the pair of stereo images;
wherein using cropped and subsampled stereo images to perform dense stereo matching significantly speeds up the dense stereo matching operation.

11. The apparatus of claim 10, wherein the program module is executed by the one or more processors to perform a rectification operation on the pair of sub sampled stereo images to remove image distortion and to establish spatial references for the dense 3D point map using the position of one of the pair of stereo vision cameras in the stereo vision system, prior to performing the dense stereo matching operation on the pair of sub sampled stereo images.

12. The apparatus of claim 10, wherein the program module is executed by the one or more processors to perform a noise removal operation on the generated dense 3D point map to remove noise introduced by textureless regions in the space from the generated dense 3D point map, after generating the dense 3D point map.

13. The apparatus of claim 10, wherein the program module is embedded in an unmanned aerial vehicle (UAV), and wherein the program module is executed by the one or more processors to use the generated dense 3D point map to detect obstacles in a flight path of the UAV.

14. The apparatus of claim 13, wherein the program module is executed by the one or more processors to use the generated dense 3D point map to make obstacle avoidance decisions for the UAV if an obstacle is detected in the flight path.

15. An unmanned aerial vehicle (UAV) capable of performing autonomous obstacle detection and avoidance, the UAV comprising:
one or more processors;
a memory coupled to the one or more processors;
a pair of stereo vision cameras coupled to the one or more processors and the memory, wherein the pair of stereo vision cameras is configured to capture a sequence of stereo images;
a stereo vision module configured to:
receive a pair of input stereo images captured by the pair of stereo vision cameras;
perform a border cropping operation on the pair of input stereo images to obtain a pair of cropped stereo images, thereby reducing the number of pixels in the pair of input stereo images;
perform a subsampling operation on the pair of cropped stereo images to obtain a pair of subsampled stereo images, thereby further reducing the number of pixels in the pair of input stereo images; and
perform a dense stereo matching operation on the pair of subsampled stereo images to generate a dense three-dimensional (3D) point map of a space corresponding to the pair of stereo images;
wherein using cropped and subsampled stereo images to perform dense stereo matching significantly speeds up the dense stereo matching operation.

16. The UAV of claim 15, wherein prior to performing the dense stereo matching operation on the pair of subsampled stereo images, the stereo vision module is configured to perform a rectification operation on the pair of subsampled stereo images to remove image distortion and to establish spatial references for the dense 3D point map using the position of one of the pair of stereo vision cameras in the stereo vision system.

17. The UAV of claim 15, wherein after generating the dense 3D point map, the stereo vision module is configured to perform a noise removal operation on the generated dense 3D point map to remove noise introduced by textureless regions in the space from the generated dense 3D point map.

18. The UAV of claim 15, wherein the stereo vision camera set is configured to capture a flight environment of the UAV during a flight of the UAV.

19. The UAV of claim 15, further comprising an obstacle detection module coupled to the stereo vision module and configured to use the generated dense 3D point map to detect obstacles for the UAV.

20. The UAV claim 19, further comprising an obstacle avoidance module coupled to the obstacle detection module and the stereo vision module and configured to use the generated dense 3D point map to make obstacle avoidance decisions for the UAV if an obstacle is detected.

* * * * *